United States Patent [19]

Columbus

[11] Patent Number: 4,618,476

[45] Date of Patent: Oct. 21, 1986

[54] CAPILLARY TRANSPORT DEVICE HAVING SPEED AND MENISCUS CONTROL MEANS

[75] Inventor: Richard L. Columbus, Rochester, N.Y.

[73] Assignee: Eastman Kodak Company, Rochester, N.Y.

[21] Appl. No.: 666,719

[22] Filed: Oct. 31, 1984

Related U.S. Application Data

[63] Continuation-in-part of Ser. No. 579,056, Feb. 10, 1984, abandoned.

[51] Int. Cl.[4] .......... G01N 1/00; G01N 27/46

[52] U.S. Cl. .......... 422/100; 204/409; 204/416; 422/50

[58] Field of Search .......... 422/55, 58, 100, 50, 422/102; 204/409, 416

[56] References Cited

U.S. PATENT DOCUMENTS 4,233,029 11/1980 Columbus .
4,271,119 6/1981 Columbus .
4,302,313 11/1981 Columbus .
4,310,399 1/1982 Columbus .

FOREIGN PATENT DOCUMENTS 2090659 7/1982 United Kingdom .

*Primary Examiner*—Arnold Turk
*Attorney, Agent, or Firm*—Dana M. Schmidt

[57] ABSTRACT

There is described a capillary transport device wherein the transport zone includes energy barriers such as ribs extending partway from one opposing surface to the other opposing surface of the zone, and slot means for preventing air entrapment, such means being in each energy barrier, or in every other energy barrier.

There is also described a method of providing a non-mixing junction between two miscible liquids.

8 Claims, 20 Drawing Figures

COMPARATIVE EXAMPLE

FIG. 12
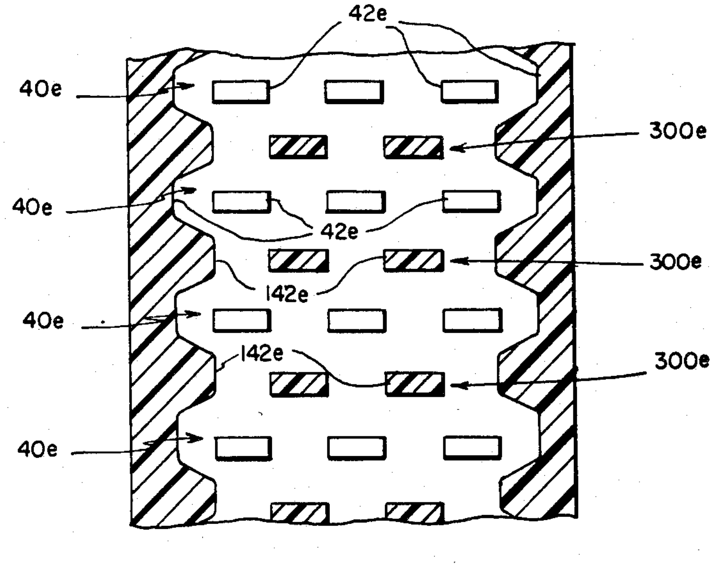
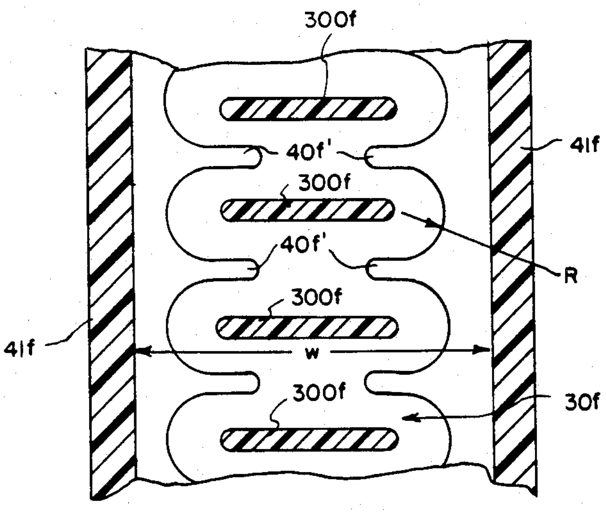
FIG. 15

CAPILLARY TRANSPORT DEVICE HAVING SPEED AND MENISCUS CONTROL MEANS

This Application is a Continuation-in-Part of Ser. No. 579,056, filed Feb. 10, 1984, abandoned.

FIELD OF THE INVENTION

This invention is directed to a device and a method for transporting liquid by capillary attraction between two opposing surfaces.

BACKGROUND OF THE INVENTION

In the capillary transport of liquids between opposing surfaces, two liquids can be brought together by flowing in opposing directions, creating a flow in opposition, or they can be transported in a concurrent flow wherein they advance simultaneously and together through the same part of the zone. In the first case, the intent can be to have only one of the two liquids in any one of two parts of the zone, the liquids meeting at a junction between the two parts. In the second, concurrent flow case, the intent can be for each of the liquids to traverse essentially all of the transport zone, arriving in generally equal amounts at a final destination.

In either case, it can be important that the liquids flow in a controlled manner. For example, if opposing flow transport is being used as an ion bridge between ion-selective electrodes, hereinafter "ISE", two liquids are introduced into the spacing between the surfaces to advance in opposite directions ideally at equal rates to meet at a predetermined junction, as explained, for example, in my U.S. Pat. No. 4,271,119, issued on June 2, 1981. However, when testing biological liquids against a reference liquid having a different viscosity and/or surface tension, using the differential analysis of the aforesaid patent, it is common for the one liquid to flow much faster than the other. If the faster flow pushes into contact with the ISE that is intended for the other liquid, the test is ruined. To keep this from happening, I have disclosed techniques such as the coating of at least one of the opposing capillary surfaces with a water-swellable or water-dissolvable substance, as described, for example, in my U.S. application Ser. No. 537,553, filed on Oct. 3, 1983, now U.S. Pat. No. 4,549,952, entitled "Capillary Transport Device Having Means for Increasing the Viscosity of the Transported Liquid", which is a continuation-in-part application of U.S. Ser. No. 443,785, filed on Nov. 22, 1982 now abandoned. Although such coatings are very effective, they do require the additional step of applying the coating. In some cases it would be advantageous if a speed-of-flow control could be constructed that does not require an additional layer of material. On the other hand, mechanical constraints to flow tend to be objectionable because they can cause air entrapment. Such air entrapment is undesirable as it tends to unpredictably interfere with flow through the transport. A capillary transport device is described in my U.S. Pat. No. 4,233,029, issued on Nov. 11, 1980, having ribs that restrain the flow between capillary surfaces while avoiding air entrapment. However, to make the flow completely predictable, the ribs are provided on both of the opposed capillary surfaces. It is desirable at least from the standpoint of production to provide controlled flow wherein at least one of the opposing capillary surfaces is left generally smooth. Prior to this invention, it has not been clear how this could be done and still avoid air entrapment.

SUMMARY OF THE INVENTION

I have discovered a capillary transport construction that acts to control factors such as the speed of capillary flow in a capillary transport without requiring the use of a gelatinous coating or a coating that dissolves.

More specifically, there is provided a liquid-transport device having two opposed surfaces spaced apart a distance effective to induce capillary flow between the surfaces of introduced liquid and thus provide a capillary zone, and access means for admitting liquids to the zone. This device is improved in that one of the surfaces includes (a) spaced-apart energy barriers extending across a portion of the primary direction of travel of liquid through the zone, the barriers (i) having a height less than the distance between the surfaces and (ii) being effective to retard the rate of flow of liquid through the zone, and (b) slot means for preventing air entrapment between the energy barriers. In accord with one embodiment of the invention, such slot means are located in each of the energy barriers. In accord with another embodiment of the invention, such slot means are located in every other one of said barriers.

In accordance with another aspect of the invention, there is also provided a method for producing a non-mixing junction between two dissimilar but miscible liquids. The method comprises the steps of (a) introducing both of the liquids into a transport zone having a spacing that induces the liquids to flow under capillary attraction, and (b) allowing the liquids to flow through the zone, side-by-side.

Thus, it is an advantageous feature of the invention that the capillary surfaces of the transport provide mechanical energy barriers to the flow effective to control the velocity and the shape of the advancing contact line, without causing air entrapment.

It is a further advantageous feature that such control is achieved without requiring both opposing capillary surfaces to be specially modified.

Other advantageous features will become apparent upon reference to the following "Description of the Preferred Embodiments", when read in light of the attached drawings.

BRIEF DESCRIPTION OF THE DRAWINGS

FIG. 12 is a fragmentary view similar to that of FIG. 11, except that it is a sectional view taken within the capillary spacing between the opposing surfaces, illustrating still another embodiment;

FIG. 15 is a fragmentary sectional view similar to that of FIG. 12, but illustrating still another embodiment.

DESCRIPTION OF THE PREFERRED EMBODIMENTS

As is apparent from the following description, the device of the invention is preferably used to convey one or more biological liquids, and most preferably two such liquids to a junction interface within the device, such as in an ion bridge. Also, it preferably utilizes energy barriers that are linear and parallel to each other. In addition, the invention is applicable to capillary transport devices for any liquid, regardless of the particular end use, particularly when the speed of transport through the device or the shape of the advancing meniscus needs to be controlled. It is further applicable to such capillary transport devices whether or not the energy barriers are linear or parallel.

Figure 1:
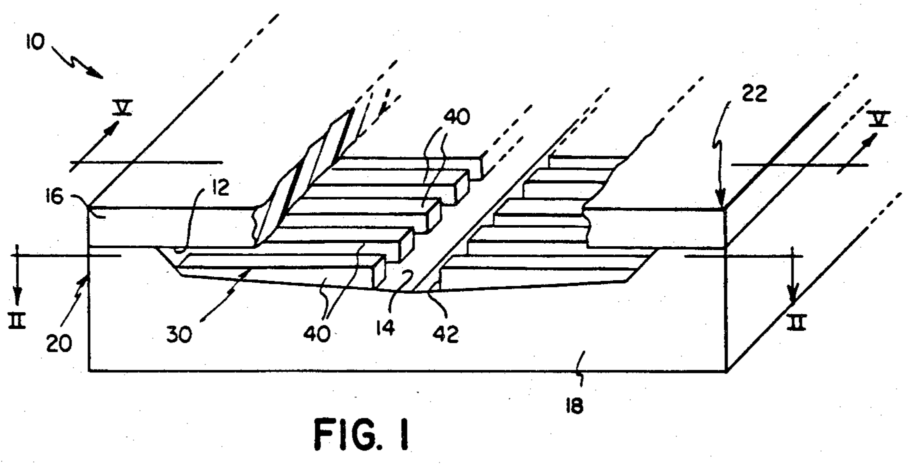
FIG. 1 is a fragmentary isometric view, partially broken away, of a capillary transport device constructed in accordance with the invention.
Figure 2:
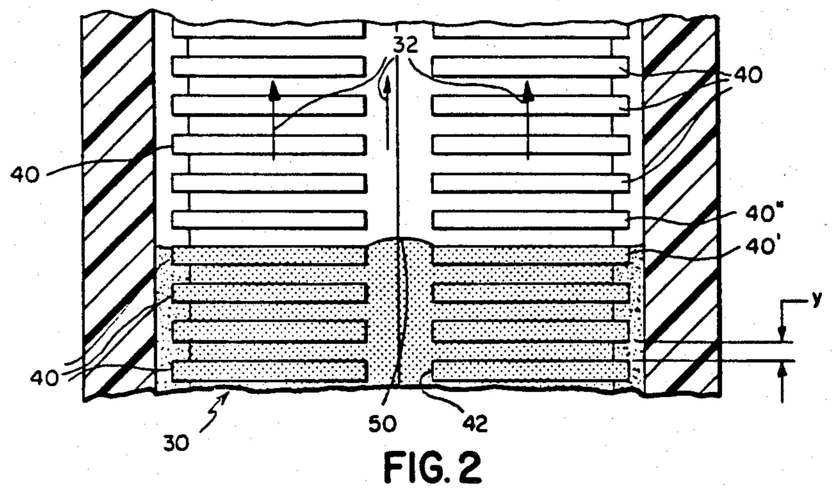
FIG. 2 is a fragmentary sectional view taken generally along the plane of line II—II of FIG. 1 that extends through and generally parallel to the transport zone, except that a transported liquid has been added.

Device 10, FIGS. 1-3, is illustrative of the invention. It comprises two opposed surfaces 12 and 14 provided by a top member 16 and a bottom member 18, respectively. Surfaces 12 and 14 meet at edges 20 and 22 of the zone, which are sealed such as by adhesive to provide an enclosed transport zone 30. The liquid to be transported is introduced through apertures shown dotted in FIG. 5, in either member, or an aperture formed by exposing the capillary gap at either end. Although surface 14 is shown as being concave away from surface 12, this is not critical since the two surfaces can also be parallel.

In accord with one aspect of the invention, to control the rate of flow within zone 30 along the primary flow path (arrow 32, FIG. 2), energy barriers in the form of ribs 40 are provided on one of the surfaces, such as surface 14, extending into the flow of path 32. Such ribs do not, however, extend all the way across to the opposing surface, in this case surface 12, but instead leave a spacing "d", FIG. 5. As will be readily apparent, the maximum spacing "s", FIG. 5, between surfaces 12 and 14 does not exceed a capillary spacing, as defined in my U.S. Pat. No. 4,233,029. Preferably, FIG. 3, ribs 40 extend all the way to the edges of the zone until they intersect the rising sidewalls 41 at such edges.

Figure 5:
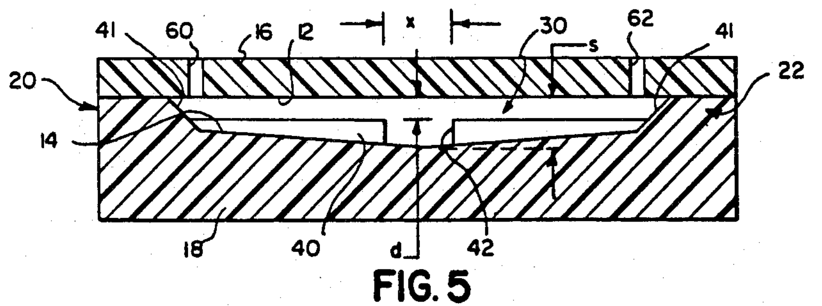
FIG. 5 is a vertical sectional view taken generally along the plane of line V—V of FIG. 1.
Figure 3A:
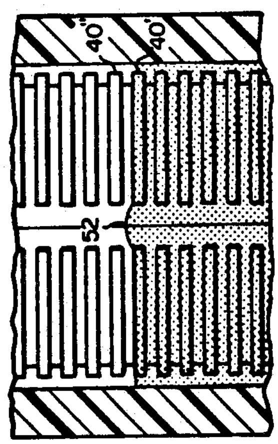
FIGS. 3A-3E are fragmentary views similar to that of FIG. 2, but illustrating subsequent meniscus positions compared to the previous view.
Figure 3B:
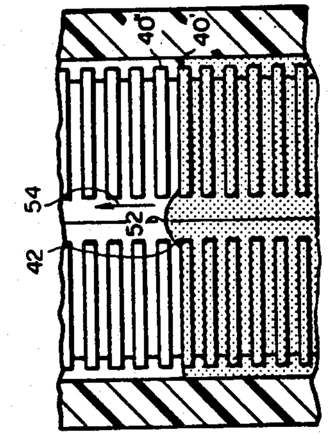
Figure 3C:
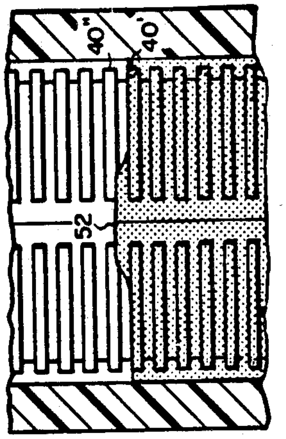
Figure 3D:
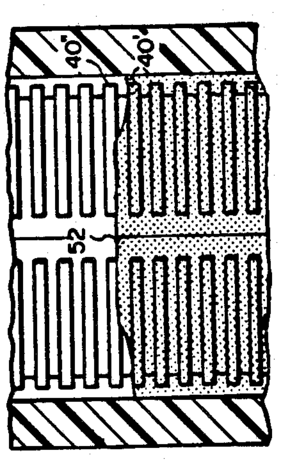
Figure 3E:
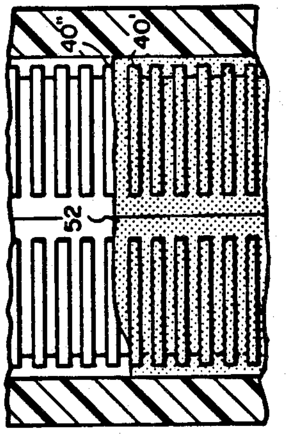

To prevent air entrapment, a flow-through slot 42 is provided in each of the ribs. (Not all such slots nor all the ribs have been numbered in FIGS. 1 or 2, for purposes of clarity.) The slots have a maximum dimension x transverse to the direction of flow 32, FIG. 5, that is selected in light of the desired flow characteristics. I have discovered that if all slots 42 are omitted, flow over the ribs tends to be unpredictable to the point that air entrapment occurs due to left, right or both left and right edge fillings, as described in detail hereafter. Particularly this is a problem if spacing s, FIG. 5, is 50 μm or less, since in such a case any sag in top member 16 extending lengthwise in the direction of the flow tends to create, during liquid transport, air pockets in the center. The mechanism is believed to be that the sag reduction in the spacing s in front of the meniscus encourages liquid to wrap around air to form pockets. Such sag could occur, for example, due to deformation during storage, and the like.

Slots 42 are located between edges 20 and 22, rather than at either edge, and preferably approximately midway between. The reason for such location is that it induces the liquid to advance across each rib by first proceeding through and beyond the slot for that rib. Thus, at a given point in its movement the meniscus will occupy the position 50 shown in FIG. 2, because of the energy barrier created by rib 40'. Thereafter, the meniscus surges forward as a tongue 52, FIGS. 3A-3C, in the direction indicated by arrow 54, FIG. 3B, the vicinity of the slot 42, until, FIGS. 3C and 3D, tongue 52 strikes the next adjacent rib 40" in the vicinity of slot 42. At this point in time the liquid moves rapidly laterally in both directions from the tongue 52, to fill in the gap between ribs 40' and 40". As a result, air is pushed out in front of the meniscus, from the center outward, until, FIG. 3E, the gap is essentially filled. The process then repeats itself. It is this constant filling from the approximate center, outwards, that avoids air entrapment.

Figure 4:
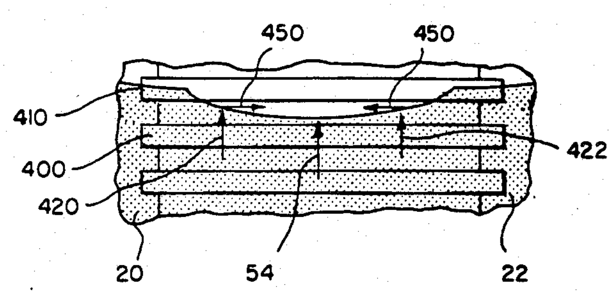
FIG. 4 is a fragmentary view similar to that of FIG. 2, but illustrating a comparative example.

In contrast, FIG. 4, if no slot occurs in two adjacent ribs 400 and 410, the meniscus tends to advance first from either or both edges 20 and 22, arrows 420 and 422, instead of at arrow 54. When the liquid reaches rib 410, it tends to move or fill laterally towards the center, arrows 450. It is this lateral movement from the left or right edge towards, rather than away from, the center that tends to cause air entrapment.

Most preferably, each of the slots 42 is aligned with the next adjacent slots of the next adjacent ribs. In another preferred embodiment, the slots are only approximately aligned, a portion of each slot lining up with a portion of the slot of the next adjacent rib.

The shape of slots 42 is not critical. Thus, V-shapes, irregular shapes, semi-circles and the like are also useful.

In the event device 10 is to be used, as is preferred, to transport two different liquids from different locations into contact with each other, the air between the two advancing wavefronts has to be released. Preferably this is accomplished, FIG. 5, by a series of air release apertures 60 and 62 formed in member 16 near edges 20 and 22. These latter apertures are omitted if air release from between converging wavefronts is not needed.

A variety of values are possible for dimensions "d" and "x", FIG. 5. Preferably, d is between about 0.007 cm and about 0.02 cm, and x is between about 0.02 cm and about 0.2 cm. Most preferably, x is between about 7% and about 36% of the total width w of zone 30.

In addition, ribs 40 can have a variety of spacings y, FIG. 2. Most preferably, the y spacing is between about 0.05 cm and about 0.07 cm.

A variety of materials is useful in making device 10, although such materials should be selected for wettability with the liquid being transported. More specifically, the materials are preferably selected to give a contact angle that is between about 65° and about 82° for the liquid being transported.

Figure 6:
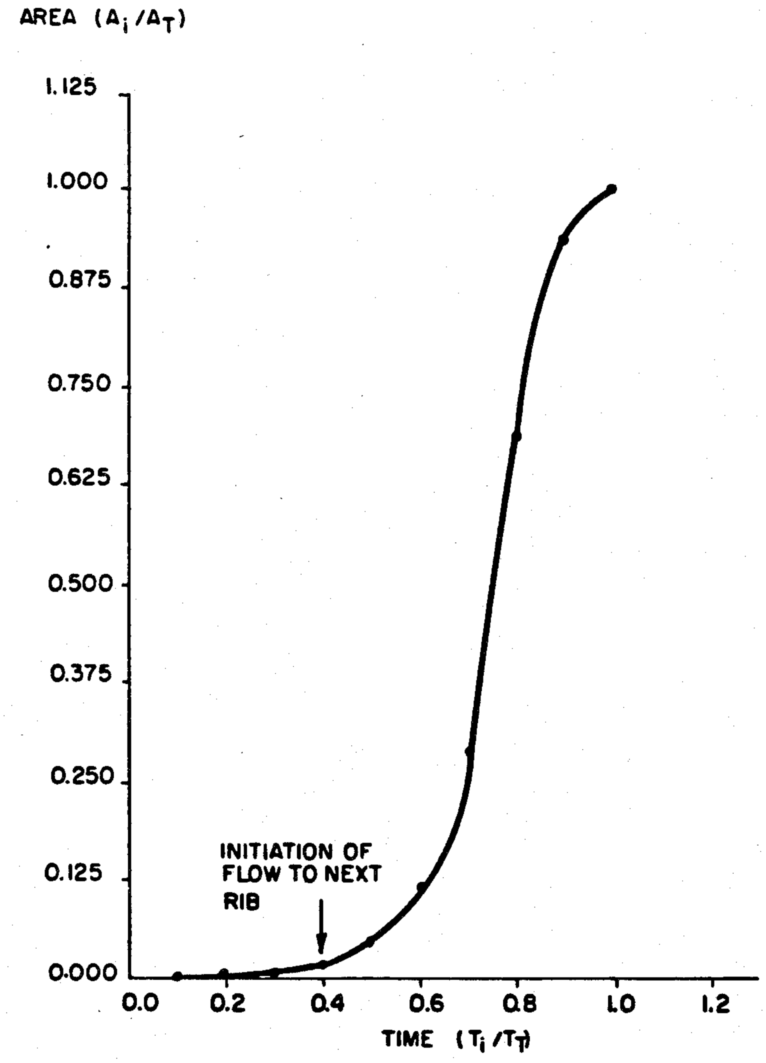
FIG. 6 is a plot of the ratio of Area $A^i$ in the process of being filled between two ribs versus the total area $A_T$ between such two ribs against the ratio of time $T_i$ in the process of being used to fill area $A_i$, versus the total time $T_T$ needed to fill area $A_T$.

FIG. 6 demonstrates the flow characteristics of zone 30 when using dyed water, polystyrene as member 18, and poly(ethylene terephthalate) as member 16. The initiation of tongue 52 is quite slow until $T_i/T_T$=about 0.4 is reached, at which point area fill occurs more rapidly. As noted above, $T_i/T_T$ is the ratio of the time taken to fill fractional area $A_i$, to the time $T_T$ required to fill the total area $A_T$ between two ribs. If surface 12 were more hydrophobic, the point of initiation would be significantly delayed, but the slope of the curve would be only slightly altered.

Figure 7:
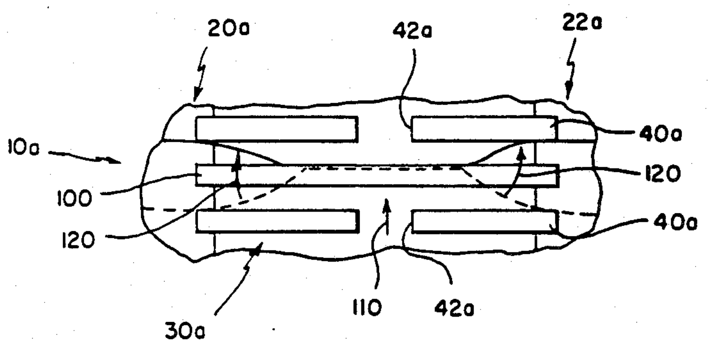
FIG. 7 is a fragmentary view similar to that of FIG. 2, but illustrating an alternate embodiment of the invention.

Not every rib need be slotted, if every other rib is, as shown in the embodiment of FIG. 7. Parts similar to those previously described bear the same reference numeral, to which the distinguishing suffix "a" has been added. (The dots representing the liquid have been omitted for clarity.) Thus, device 10*a* comprises a zone 30*a* constructed as before, except that slots 42*a* occur only in every other rib 40*a*. In between each slotted rib is one and only one unslotted rib 100. The flow proceeds thusly: When the liquid goes from first-encountered rib 40*a* in the direction of arrow 110 to the meniscus position shown in dotted line on rib 100, the mechanism is as described for the embodiment of FIG. 3. However, flow then proceeds as per arrows 120 as per the mechanism of comparative example FIG. 4, to provide the meniscus shape shown as a solid curve. Nevertheless, the risk of liquid closure in the center so as to entrap air is minimized by the presence of slot 42*a* in second-encountered rib 40*a*. The flow from the latter rib 40*a* will then repeat that shown for the first-encountered rib 40*a*. Thus, slots in every other rib act to reinitiate flow at a central location (between edges 20*a* and 22*a*) into the space between the rib energy barriers.

Figure 8:
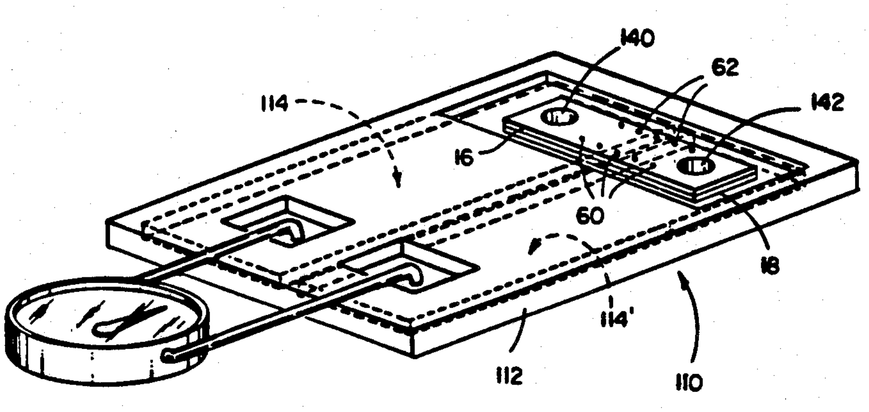
FIG. 8 is an isometric view of an ISE test element utilizing the capillary transport device of the invention as the ion bridge.

FIG. 8 illustrates one use of such a capillary transport device. Specifically, as in U.S. Pat. No. 4,302,313, the device functions as an ion bridge 136 covering and contacting two ion-selective electrodes 114 and 114' constructed and mounted in a support element 112 as described in the '313 patent. Apertures 140 and 142 in member 16 are access apertures providing passage of two different liquids to the capillary transport zone, and two additional apertures not shown, in member 18 under apertures 140 and 142 permit such liquids to contact their respective electrodes. Apertures 60 and 62 are the air release apertures described above.

Figure 9:
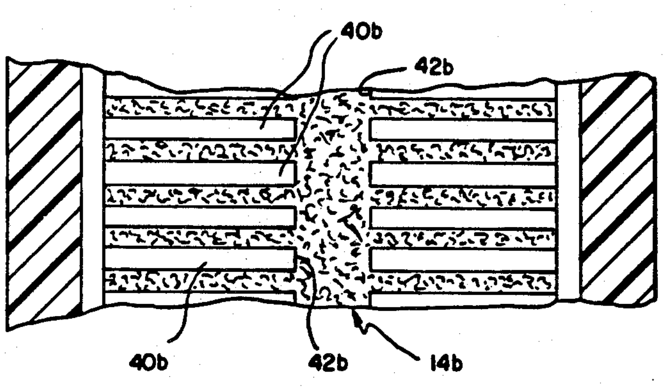
FIG. 9 is a sectional view similar to that of FIG. 2, but illustrating yet another alternate embodiment.

Equivalent energy barriers, shown in FIG. 9, are useful in lieu of the above-described ribs. For example, alternating portions of surface 14*b* can be permanently converted from a hydrophobic nature, which is common in plastics, to a hydrophilic nature by using one or more of the techniques, such as corona discharge, described in col. 9 of the aforesaid U.S. Pat. No. 4,233,029. The result is to render hydrophilic, and thus more easily wettable by the liquid, the portions, marked with squiggly lines, of surface 14*b* that were unoccupied by ribs in the previously described embodiments. The portions 40*b* that remain hydrophobic, act as energy barriers. Portions 42*b* extending between portions 40*b* function as slots between these energy barriers.

The preceding embodiments work best if flow of the two liquids is in opposite directions. If concurrent flow is desired, the embodiments of FIGS. 10-15 are preferred. Parts similar to those previously described bear the same reference numeral to which the distinguishing suffix "c", "d", "e" or "f" is appended.

Figure 10:
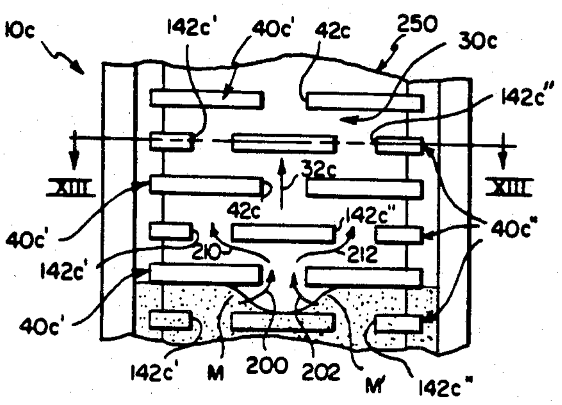
FIGS. 10-11 are each a fragmentary bottom view similar to that of FIG. 2, but illustrating still other alternate embodiments that have the bottom member removed.
Figure 13:
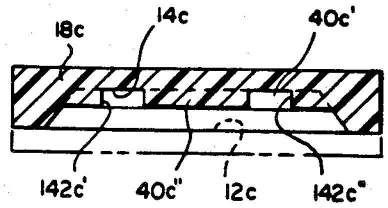
FIGS. 13-14 are vertical section views similar to that of FIG. 5, but taken along lines XIII—XIII and XIV—XIV, respectively, of FIGS. 10 and 11.

Thus, in FIGS. 10 and 13, a capillary transport zone 30*c* of device 10*c* is formed between two opposing surfaces 12*c* and 14*c*, and ribs 40*c* extend from surface 14*c* as in the previous embodiment. However, surfaces 12*c* and 14*c* preferably are reversed in their positions—that is, surface 14*c* becomes the upper surface so that ribs 40*c* depend downwardly during use, FIG. 13. In addition, slots are provided within ribs 40*c* so that about one-half of the ribs (labeled 40*c*', FIG. 10) have one slot, 42*c*, whereas the other half (labeled 40*c*", FIGS. 10 and 13) have two slots 142*c*' and 142*c*". Furthermore, the slots of two adjacent ribs are transversely displaced, relative to the primary direction of flow 32*c*, from each other, so that slots 42*c* are offset from or misaligned with slots 142*c*' and 142*c*".

The concurrent flow of the two liquids in device 10*c* proceeds as shown by arrows 200,202 and 210, 212. That is, if the two liquids are introduced from two different sources at the two slots 142*c*' and 142*c*", respectively, they will tend to form menisci m and m', FIG. 10. These menisci will then meet and flow out through the next slot 42*c* as shown by solid arrows 200, 202. Contrary to what might be expected for miscible liquids, this does not cause intermixing by convection of two miscible liquids, as long as the liquids are not pressurized within zone 30*c* and as long as they are simultaneously introduced into the transport zone 30*c*. (Diffusion mixing is presumed to occur.) As shown by differential dye concentration studies, the advancing liquids stay split up as shown by arrows 210, 212, and make the next advance out through slots 142*c*' and 142*c*". Thereafter, the meniscus shapes will be similar to that of m and m', but advanced farther into the device. Alternating flow through slots 42*c* and slots 142*c*', 142*c*" serves thus to advance the two liquids as two separate streams flowing side-by-side in the direction of arrow 32*c*.

Figure 11:
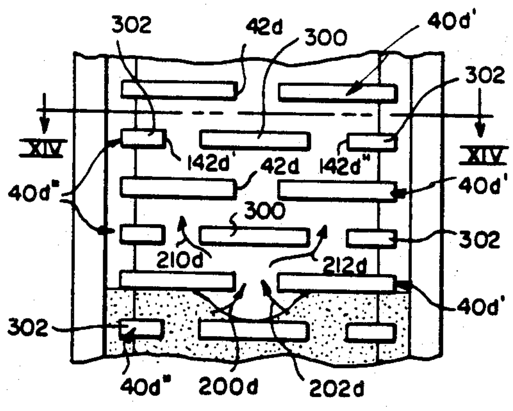
Figure 14:
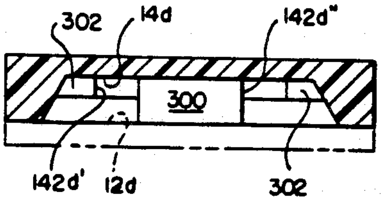

In the embodiment of FIGS. 11 and 14, the primary difference from the previously-described embodiment is that the middle portion 300 of ribs 40*d*" extends completely across zone 30*d* as a wall to connect surfaces 12*d* and 14*d*. The remaining portions 302 of such ribs, as well as ribs 40*d*', are the same as before. Also, as before, slots 142*d*' and 142*d*" of ribs 40*d*" are transversely displaced, rather than aligned, with slots 42*d* of ribs 40*d*'. Thus, the flow pattern is similar in that the liquid advances via the paths of arrows 200*d*, 202*d*, and then paths of arrows 210*d*, 212*d*. (Alternatively, portions 302 of ribs 40*d*" can be omitted entirely, leaving just walls 300.)

In the embodiment of FIG. 12, all the energy barriers across the primary flow direction have more than one slot. The barriers are of two types—ribs 40*e*, and wall means 300*e* connecting opposing capillary surfaces. The ribs and the wall means alternate with each other, and rib slots 42*e* are transversely displaced, and thus misaligned, with slots 142*e* of wall means 300*e*. The flow pattern is very similar to that of FIG. 11.

Alternatively, instead of the rectilinear configuration of energy barriers 40*e* and 300*e*, cylindrical shapes can be used for one or both types of energy barriers.

In all of the aforesaid embodiments, it is not essential that the ribs that have rib slots, be square with respect to the sidewalls. Thus, in the embodiment of FIG. 15, the construction is similar to that of FIG. 11, except that ribs 40*f* are joined to sidewalls 41*f* with a curved intersection. (Ribs 300*f* extend the full height of the capillary zone.) The curved intersection by which ribs 40$f'$ join the sidewalls acts to induce a more sweeping action by the liquid and thus to minimize stagnant action by the liquid. Useful radii of curvature for such curved intersections include those wherein the ratio of the radius of curvature, R, to the total width w of zone 30$f$, is about 35/1000.

In addition to the uses already described, the embodiments of FIGS. 10–15 can also be used to handle a flow of a single liquid, particularly highly viscous liquids. For example, pathological liquids will flow by a decrease in flow restrictions provided by the serpentine paths described, while maintaining control over flow times.

Figure 16:
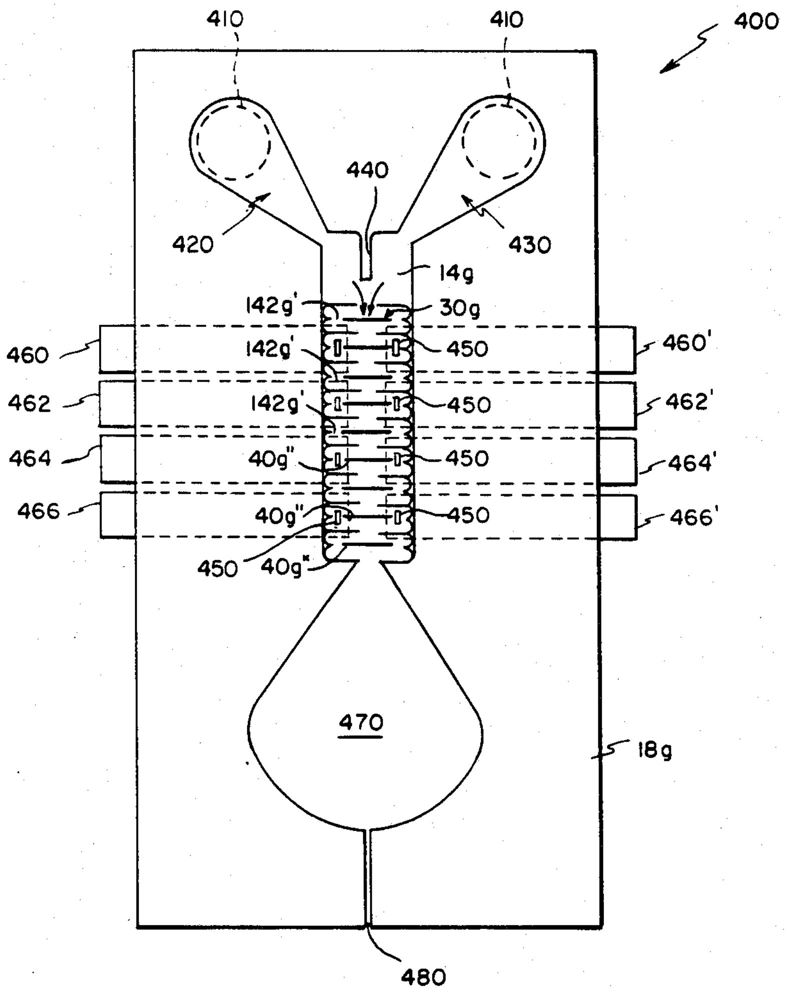
FIG. 16 is a plan view of a portion of an ISE test element constructed using the principles of the previous embodiments.

The embodiments of FIGS. 10–15 can be used wherever concurrent flow, but without mixing, is desired. FIG. 16 is one illustration of such use. As has been indicated in prior literature, the ideal liquid junction between two disparate liquids used in a differential potentiometric test is one in which no mixing of the liquids occurs in the ion bridge. Thus, FIG. 16 is a view of a multiple test element 400 wherein the top cover sheet, having inlet apertures 410 occupying the positions shown when assembled, has been removed (and is otherwise not shown). The bottom sheet 18$g$, similar to top sheet 18$c$ of the embodiment of FIG. 10 and 13, has a cavity defining the capillary transport zone 30$g$, and liquid-delivery zones 420 and 430 which are also capillary zones. The ribs of zone 30$g$ are substantilly as shown in FIG. 10, that is, do not extend the full capillary distance separating the capillary surface of the apertured top sheet, from surface 14$g$ of sheet 18$g$. However, optionally a partition 440 that does extend the full capillary distance may be disposed between zones 420 and 430 to direct flow of the two liquids downward into zone 30$g$, to create concurrent flow, rather than towards each other as would create opposing flows.

In the slots 142$g'$ between every other rib 40$g''$, apertures 450 are provided all the way through sheet 18$g$. These apertures are configured substantially as is described in U.S. Pat. No. 4,271,119, and particularly as in FIG. 10. Although the long axis of apertures 450 is normal to slots 142$g'$, there is enough flow perpendicular to such long axis as to insure complete wetting of the apertures to provide continued flow out of the plane of surface 14$g$. Located underneath sheet $18_g$ and each of the apertures 450 is an ion-selective electrode (ISE) constructed also as described concerning FIG. 10 of the '119 patent. The ISE's are paired as follows: ISE 460 and 460' are specific to one ionic analyte, 462 and 462' to a second ionic analyte, 464 and 464' to a third ionic analyte, and 466 and 466' to a fourth ionic analyte. Most preferably, the distance between apertures 450 for any one pair of ISE's is about 1 cm.

Cavity 470 in sheet 18$g$ is a drain cavity that collects overflow. It terminates in a vent aperture 480. Alternatively, cavity 470 can be omitted, where a reservoir is not needed.

As a result, two dissimilar but miscible liquids introduced into zone 30$g$ via apertures 410 will flow side-by-side, along serpentine paths, producing a junction that approximately bisects apertures 42$c$ and is substantially free of convection mixing. Portions of each liquid, one of which is a reference liquid, are withdrawn through apertures 450 into contact with their respective ISE's, and the differential potentiometric method of measuring is accomplished in the usual manner with an electrometer, not shown.

It has been found that zone 30 $g$ is effective to provide the desired concurrent flow of both liquids, even when the viscosity of one liquid would normally make it flow substantially slower than the other. The effect appears to be one in which the faster flowing liquid "pulls" the slower flowing liquid along with it.

The invention has been described in detail with particular reference to preferred embodiments thereof, but it will be understood that variations and modifications can be effected within the spirit and scope of the invention.

What is claimed is:

1. In a liquid transport device having two opposed surfaces spaced apart a distance effective to create a capillary transport zone and to induce capillary flow between said surfaces of introduced liquid, said opposed surfaces being joined together at opposite edges of said zone, whereby flow of introduced liquid and air is confined between said edges, and access means for admitting liquids to said zone.

the improvement wherein one of said surfaces includes: (a) spaced-apart energy barriers extending across a portion of a primary direction of travel of liquid through said zone between said edges, said barriers (i) having a height less than said distance between said surfaces and (ii) being effective to retard the rate of flow of liquid through said zone, and (b) means on said one sufface for initiating liquid flow past each of said energy barriers at a predetermined location between said edges.

2. A device as defined in claim 1, wherein said predetermined initiating location is approximately centered between said edges.

3. A device as defined in claim 1, wherein said energy barriers are spaced-apart ribs.

4. A device as defined in claim 1, and further including, between each of said barriers and extending across said portion of said primary direction of liquid travel, wall means having a height equal to said distance between said surfaces, whereby said surfaces are connected by said wall means; and slot means formed in said wall means permitting liquid flow around said wall means.

5. A device as defined in claim 4, wherein said slot means of said wall means are displaced from said flow initiating means of said energy barriers in a direction generally perpendicular to said primary direction of travel.

6. A device as defined in claim 1, wherein said means on said one surface comprise a slot through at least every other one of said energy barriers.

7. A device as defined in claim 6, wherein each of said slots has at least a portion aligned with a portion of the next adjacent slot.

8. A device as defined in claim 6, wherein one-half of said energy barriers have only one of said slots and the other half have two of said slots displaced transversely, relative to said primary direction of liquid travel, from the location of said slots of said one-half of the barriers.

* * * * *